United States Patent
Schmidt

(10) Patent No.: US 12,476,305 B2
(45) Date of Patent: Nov. 18, 2025

(54) METHOD FOR CONTROLLING THE TEMPERATURE OF A BATTERY COMPRISING A LITHIUM SALT

(71) Applicant: Arkema France, Colombes (FR)

(72) Inventor: Gregory Schmidt, Pierre-Benite (FR)

(73) Assignee: ARKEMA FRANCE, Puteaux (FR)

( * ) Notice: Subject to any disclaimer, the term of this patent is extended or adjusted under 35 U.S.C. 154(b) by 837 days.

(21) Appl. No.: 17/769,427

(22) PCT Filed: Sep. 29, 2020

(86) PCT No.: PCT/FR2020/051697
§ 371 (c)(1),
(2) Date: Apr. 15, 2022

(87) PCT Pub. No.: WO2021/074498
PCT Pub. Date: Apr. 22, 2021

(65) Prior Publication Data
US 2024/0128547 A1 Apr. 18, 2024

(30) Foreign Application Priority Data
Oct. 15, 2019 (FR) ...................................... 1911486

(51) Int. Cl.
*H01M 10/6569* (2014.01)
*B60H 1/00* (2006.01)
(Continued)

(52) U.S. Cl.
CPC .... *H01M 10/6569* (2015.04); *B60H 1/00278* (2013.01); *B60H 1/32281* (2019.05);
(Continued)

(58) Field of Classification Search
CPC ........... H01M 10/6552; H01M 10/656; H01M 10/6569
See application file for complete search history.

(56) References Cited

U.S. PATENT DOCUMENTS

2011/0219792 A1 9/2011 Rached
2012/0241129 A1 9/2012 Kohl et al.
(Continued)

FOREIGN PATENT DOCUMENTS

CN 102574442 A 7/2012
CN 109546219 A 3/2019
(Continued)

OTHER PUBLICATIONS

Office Action issued by the U.S. Patent and Trademark Office in the U.S. Appl. No. 17/769,390, mailed Sep. 24, 2024, U.S. Patent and Trademark Office, Alexandria, VA. (12 pages).
(Continued)

*Primary Examiner* — Amanda C. Walke
(74) *Attorney, Agent, or Firm* — BUCHANAN INGERSOLL & ROONEY PC

(57) ABSTRACT

A method for controlling the temperature of a battery in an electric or hybrid motor vehicle by means of a system including a vapor compression circuit in which a first heat transfer composition flows, and a secondary circuit in which a second heat transfer composition flows, the method involving: —heat exchange between the battery and the second heat transfer composition; —heat exchange between the second heat transfer composition and the first heat transfer composition; wherein the battery includes at least one electrochemical cell having a negative electrode, a positive electrode and an electrolyte including a lithium salt composition, the lithium salt composition including: —at least 99.75% by weight of a lithium salt of bis(fluorosulfonyl)imide; —chlorides Cl— at a mass content strictly less than 20 ppm. Also a system for carrying out the method.

16 Claims, 1 Drawing Sheet

(51) Int. Cl.
  *B60H 1/32* (2006.01)
  *C09K 5/04* (2006.01)
  *H01M 10/0568* (2010.01)
  *H01M 10/625* (2014.01)
  *H01M 10/6552* (2014.01)
  *H01M 10/66* (2014.01)
  *H01M 10/052* (2010.01)

(52) U.S. Cl.
  CPC ......... *C09K 5/044* (2013.01); *H01M 10/0568* (2013.01); *H01M 10/625* (2015.04); *H01M 10/6552* (2015.04); *H01M 10/66* (2015.04); *B60H 2001/00307* (2013.01); *H01M 10/052* (2013.01); *H01M 2220/20* (2013.01)

(56) References Cited

U.S. PATENT DOCUMENTS

| | | | |
|---|---|---|---|
| 2012/0267564 A1 | 10/2012 | Leck et al. | |
| 2018/0149392 A1 | 5/2018 | Rached | |
| 2018/0244970 A1 | 8/2018 | Rached | |
| 2021/0046802 A1 | 2/2021 | Rached | |
| 2022/0324288 A1* | 10/2022 | Cohan | B60L 58/26 |
| 2024/0234872 A9* | 7/2024 | Garrait | B60H 1/22 |

FOREIGN PATENT DOCUMENTS

| | | | | |
|---|---|---|---|---|
| CN | 109941978 A | | 6/2019 | |
| CN | 113490821 A | * | 10/2021 | ............... C09K 5/10 |
| CN | 116742187 A | * | 9/2023 | .......... H01M 10/613 |
| CN | 117400688 A | * | 1/2024 | ......... B60H 1/00278 |
| DE | 202014010264 U1 | | 2/2015 | |
| EP | 2516578 A1 | | 10/2012 | |
| EP | 3499634 A1 | | 6/2019 | |
| FR | 3079670 A1 | | 10/2019 | |
| JP | 2010261679 A | | 11/2010 | |
| WO | 2009123328 A1 | | 10/2009 | |
| WO | 2010058125 A1 | | 5/2010 | |
| WO | 2011056824 A2 | | 5/2011 | |
| WO | 2011073934 A1 | | 6/2011 | |
| WO | 2013003843 A2 | | 1/2013 | |
| WO | 2015158979 A1 | | 10/2015 | |
| WO | 2017143018 A1 | | 8/2017 | |
| WO | 2019030440 A1 | | 2/2019 | |
| WO | 2019197783 A1 | | 10/2019 | |

OTHER PUBLICATIONS

Hong-Bo Han et al., "Lithium bis(fluorosulfonyl)imide (LiFSI) as conducting salt for nonaqueous liquid electrolytes for lithium-ion batteries: Physicochemical and electrochemical", Journal of Power Sources, vol. 196, No. 7, Dec. 10, 2010, pp. 3623-3632. (10 pages).
International Search Report (PCT/ISA/210) with English translation and Written Opinion (PCT/ISA/237) mailed on Jan. 12, 2021, by the European Patent Office as the International Searching Authority for International Application No. PCT/FR2020/051697. (17 pages).
International Search Report (PCT/ISA/210) with English translation and Written Opinion (PCT/ISA/237) mailed on Nov. 13, 2020, by the European Patent Office as the International Searching Authority for International Application No. PCT/FR2020/051696. (12 pages).

* cited by examiner

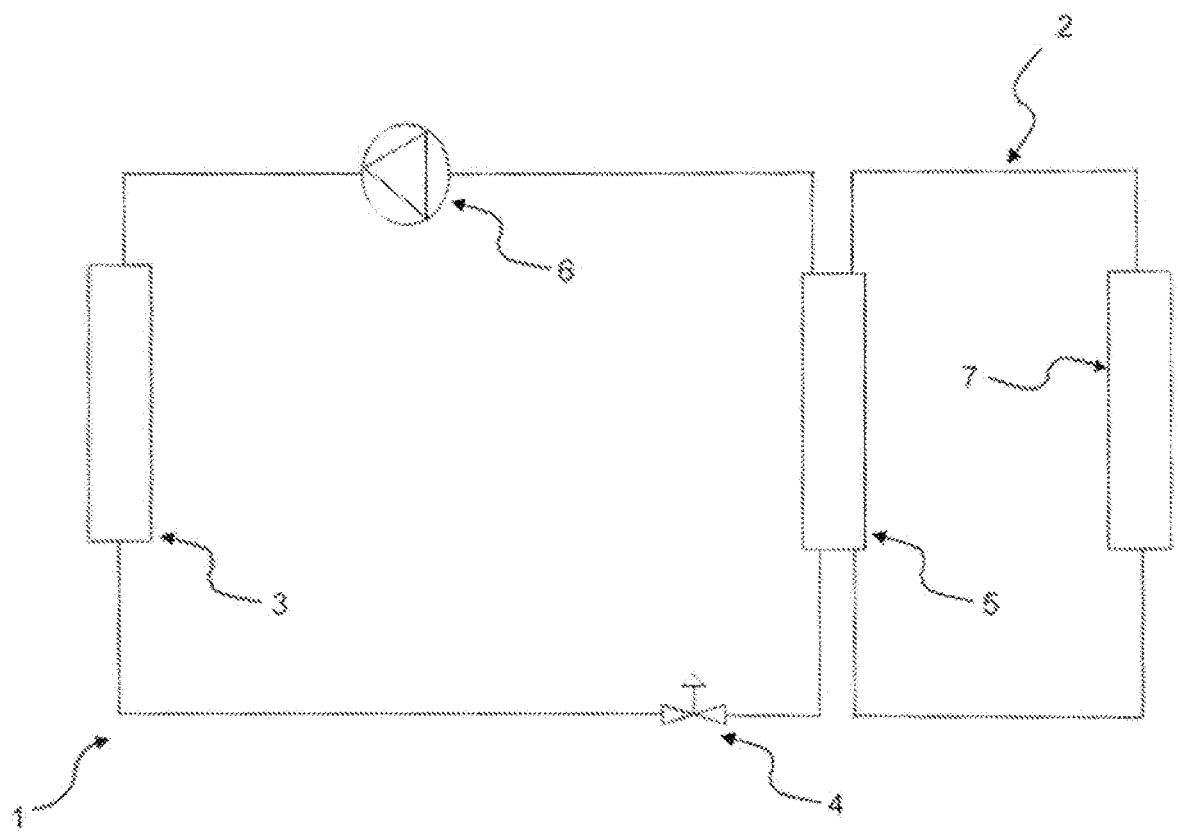

The present invention relates to a method for regulation of the temperature of a battery of a motor vehicle and also to an installation suited to the implementation of this method.

TECHNICAL BACKGROUND

The batteries of electric or hybrid vehicles give a maximum efficiency under specific conditions of use and especially in a very specific temperature range. A maximum efficiency means a high available instantaneous power, a high available total capacity, and also an increase in the battery life. Thus, the maximum efficiency of a battery makes possible not only a better performance and autonomy of the vehicles but also a lower energy consumption of the vehicles per km.

In addition, during the operation of the electric or hybrid vehicle, the temperature of the battery increases and must always be maintained at a temperature below 60° C., preferably at a temperature below 40° C., in order to avoid premature aging, indeed even the destruction, of the battery. At temperatures below 15° C., the charge of the battery decreases due to the increase in the internal resistance. Consequently, during the operation of a vehicle, the temperature of the battery should to be maintained between approximately 15 and 40° C. The operation of the battery unit below 0° C. damages the cells of the battery and consequently leads to a significant reduction in the lifetime of the battery unit, so that such a condition should be avoided.

In motor vehicles, the heat engine comprises a circuit for circulation of a heat-exchange fluid which is used for the cooling of the engine and also for the heating of the passenger compartment. To this end, the circuit comprises in particular a pump and a unit heater in which circulates a stream of air which recovers the heat stored by the heat-exchange fluid in order to heat the passenger compartment.

Furthermore, a cooling system comprises an evaporator, a compressor, a condenser, an expansion valve and a fluid capable of changing (liquid/gas) state commonly denoted refrigerant or heat-transfer fluid. The compressor, directly driven by the engine of the vehicle using a belt and a pulley, compresses the refrigerant, forcing it back under high pressure and at high temperature toward the condenser. The condenser, by virtue of forced ventilation, brings about the condensation of the gas which arrives in the gaseous state at high pressure and high temperature. The condenser liquefies the gas by virtue of the lowering in temperature of the air which passes through it. The evaporator is a heat exchanger which removes heat from the air which will be blown into the passenger compartment or battery of the vehicle. The expansion valve makes it possible to regulate the flow rate for entry of the gas into the loop via a modification of passage section depending on the temperature and on the pressure in the evaporator. Thus, the hot air coming from the outside or the battery of the vehicle is cooled in contact with the evaporator.

The refrigerant conventionally used in motor vehicle air conditioning is 1,1,1,2-tetrafluoroethane (HFC-134a).

However, a large number of HFC fluids, including HFC-134a, may make a harmful contribution to the greenhouse effect. This contribution is quantified by a numerical parameter, the GWP (Global Warming Potential).

Another refrigerant used henceforth in heat-transfer applications is 2,3,3,3-tetrafluoropropene (HFO-1234yf). However, even though HFO-1234yf is a low-GWP fluid, it is considered to be a flammable fluid.

The document EP 3 499 634 relates to a battery thermal management system of a vehicle with at least one battery unit.

The document WO 2017/143018 relates to refrigerant systems for the conditioning of air and/or of articles located in a dwelling occupied by humans or other animals.

The document DE 202014010264 relates to a vehicle comprising at least a first compression refrigeration device designed to cool an internal space of the vehicle and comprising a circulating refrigerant, characterized in that the refrigerant is a substance from the family of the fluoroketones and/or (hydro)fluoroolefins and/or (hydro)fluorochloroolefins.

There exists a need to provide a method for regulation of the temperature of a battery of a motor vehicle which is effective and safe, while limiting or reducing the amount of flammable products in the vehicle or the proximity of these to the hottest parts of the vehicle, this being done while preserving as much as possible the lifetime of the battery.

SUMMARY OF THE INVENTION

The invention relates first to a method for regulation of the temperature of a battery of an electric or hybrid motor vehicle by means of a system comprising a vapor compression circuit in which a first heat-transfer composition circulates and a secondary circuit in which a second heat-transfer composition circulates, the method comprising:
  the exchange of heat between the battery and the second heat-transfer composition;
  the exchange of heat between the second heat-transfer composition and the first heat-transfer composition;
  the battery comprising at least one electrochemical cell comprising a negative electrode, a positive electrode and an electrolyte comprising a lithium salt composition, said lithium salt composition comprising:
  at least 99.75%, preferably at least 99.85%, advantageously at least 99.95% and more advantageously still 99.99% by weight of a bis(fluorosulfonyl)imide lithium salt;
  chlorides $Cl^-$ in a content by weight strictly of less than 20 ppm;
  in which the total content by weight of chlorides $Cl^-$, fluorides $F^-$ and sulfates $SO_4^{2-}$ is preferably less than or equal to 150 ppm.

In some embodiments, the first heat-transfer composition comprises 2,3,3,3-tetrafluoropropene.

In some embodiments, the first heat-transfer composition comprises one or more heat-transfer compounds other than 2,3,3,3-tetrafluoropropene, these compounds preferably being chosen from difluoromethane, pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane and their mixtures, and more preferably this compound being difluoromethane.

In some embodiments, 2,3,3,3-tetrafluoropropene is present at a content of approximately 78.5% by weight in the first composition and difluoromethane is present at a content of approximately 21.5% by weight in the first composition.

In some embodiments, the second heat-transfer composition comprises one or more heat-transfer compounds having a boiling point of 0 to 40° C., preferably chosen from hydrochlorofluoroolefins, hydrofluoroolefins and the combinations of these; more preferably chosen from 1-chloro-3,3,3-trifluoropropene, preferably in E form, 1-chloro-2,3,3,3-tetrafluoropropene, preferably in Z form, and 1,1,1,4,4,4-hexafluorobut-2-ene in E and/or Z form.

In some embodiments, the second heat-transfer composition is at an essentially uniform pressure in the secondary circuit, said pressure being preferably equal to the saturated pressure of the second composition.

In some embodiments, the battery is maintained at a temperature of between a minimum temperature $t_1$ and a maximum temperature $t_2$.

In some embodiments, the minimum temperature $t_1$ is greater than or equal to 0° C. and the maximum temperature $t_2$ is less than or equal to 60° C., more preferably the minimum temperature $t_1$ is greater than or equal to 15° C. and the maximum temperature $t_2$ is less than or equal to 40° C., and more preferably the minimum temperature $t_1$ is greater than or equal to 16° C. and the maximum temperature $t_2$ is less than or equal to 28° C.

In some embodiments, the method is implemented during the charging of the battery of the vehicle, the battery of the vehicle being preferably fully charged in a period of time of less than or equal to 30 min and preferably of less than or equal to 15 min from its total discharge.

In some embodiments, the second heat-transfer composition is in direct contact with the battery of the vehicle.

The invention also relates to an installation for the regulation of the temperature of a battery of an electric or hybrid motor vehicle, comprising:
  a vapor compression circuit in which a first heat-transfer composition circulates; and
  a secondary circuit in which a second heat-transfer composition circulates;
  the vapor compression circuit being coupled with the secondary circuit by an intermediate heat exchanger, so as to make possible the exchange of heat between the first heat-transfer composition and the second heat-transfer composition; and the installation comprising an additional heat exchanger configured to exchange heat between the battery and the second heat-transfer composition;
  the battery comprising at least one electrochemical cell comprising a negative electrode, a positive electrode and an electrolyte comprising a lithium salt composition, said lithium salt composition comprising:
  at least 99.75%, preferably at least 99.85%, advantageously at least 99.95% and more advantageously still 99.99% by weight of a bis(fluorosulfonyl)imide lithium salt;
  chlorides $Cl^-$ in a content by weight strictly of less than 20 ppm;
  in which the total content by weight of chlorides $Cl^-$, fluorides $F^-$ and sulfates $SO_4^{2-}$ is preferably less than or equal to 150 ppm.

In some embodiments, the secondary circuit does not comprise a compressor.

In some embodiments, the circulation of the second heat-transfer composition in the secondary circuit is carried out by means of a pump, or by gravity, or by capillary action.

In some embodiments, the installation is additionally adapted for the air conditioning of the passenger compartment of the vehicle, and/or the heating of the passenger compartment of the vehicle, and/or the cooling of electronic compounds of the vehicle, and/or the heating of electronic compounds of the vehicle.

In some embodiments, the first heat-transfer composition comprises one or more heat-transfer compounds other than 2,3,3,3-tetrafluoropropene, these compounds preferably being chosen from difluoromethane, pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane and their mixtures, and more preferably this compound being difluoromethane.

In some embodiments, 2,3,3,3-tetrafluoropropene is present at a content of approximately 78.5% by weight in the first composition and difluoromethane is present at a content of approximately 21.5% by weight in the first composition.

The present invention makes it possible to meet the need expressed above. It more particularly provides a method for regulation of the temperature of a battery of a motor vehicle which is effective and safe. If appropriate, it makes it possible to limit or to reduce the amount of flammable products in the vehicle or the proximity of these products to the hottest parts of the vehicle. It also makes it possible to preserve the lifetime of the battery.

This is accomplished by virtue of the coupled use of two heat-transfer compositions, one circulating in a vapor compression circuit and the other circulating in a secondary circuit, the heat-transfer composition in the secondary circuit carrying out the required heat transfers with the battery of the vehicle. The heat-transfer composition in the secondary circuit preferably does not contain a flammable heat-transfer compound; or this composition is nonflammable. More particularly, when HFO-1234yf is used as heat-transfer fluid in the vapor compression circuit, the use of the secondary circuit makes it possible to limit the extent of the vapor compression circuit and to reduce the amount of HFO-1234yf used and/or to prevent proximity of the HFO-1234yf to the hottest elements of the vehicle, in particular the battery of the vehicle, thus reducing the risks of leakage and of fire. Moreover, the use of a secondary circuit facilitates the heat management of the vehicle. More particularly, and if electric automobiles are taken as an example, numerous sources of heat (battery, electrical and electronic circuit, engine) and also numerous requirements for heating and/or cooling (battery, passenger compartment) exist on different temperature levels. The use of a secondary circuit comprising a heat-transfer fluid facilitates the heat management of these items of equipment in comparison with other technologies.

In some embodiments, the use of the secondary circuit also makes possible a reduction in the energy consumption by virtue of a low pumping power, in comparison with the use of a single-phase heat-exchange fluid.

In some embodiments, the use of the secondary circuit comprising the second heat-transfer composition makes it possible to render the vehicle lighter, by avoiding the use of solid phase-change materials for carrying out the heat exchanges.

In some embodiments, as the second heat-transfer composition does not contain flammable heat-transfer compounds, or is at the very least nonflammable, it can also act as extinguishing agent in the event of overheating of the battery of the vehicle.

Furthermore, it has been observed that a battery containing an electrolyte as described above exhibits an improved lifetime and that the corrosion of its constituents is reduced, indeed even eliminated; and this all the more so since its temperature is regulated by the two-circuit installation described above.

The electrolyte of the invention exhibits a higher ionic conductivity and thus the battery tends to heat up less. In conjunction with the thermal regulation system, the temperature of the battery is particularly well controlled.

In addition, the reduction or the elimination of corrosion makes it possible to avoid short circuits and possibly to work in immersion of the battery.

BRIEF DESCRIPTION OF THE FIGURES

FIG. 1 diagrammatically represents an embodiment of an installation according to the invention.

DETAILED DESCRIPTION

The invention is now described in more detail and in a nonlimiting way in the description which follows.

The invention relates to a heat-transfer method for the regulation of the temperature, namely for the cooling and/or for the heating, of a battery of a motor vehicle, implemented by means of a heat-transfer installation. The installation contains a first and a second heat-transfer composition, each heat-transfer composition comprising a heat-transfer fluid which comprises one or more heat-transfer compounds.

The term "heat-transfer compound" is understood to mean a compound capable of absorbing heat by evaporating and of releasing heat by condensing, in the application under consideration.

In the context of the invention, "HFO-1234yf" refers to 2,3,3,3-tetrafluoropropene, "HCFO-1233zd" refers to 1-chloro-3,3,3-trifluoropropene, "HCFO-1224yd" refers to 1-chloro-2,3,3,3-tetrafluoropropene and "HFO-1336mzz" refers to 1,1,1,4,4,4-hexafluorobut-2-ene.

Battery of the Vehicle

The motor vehicle is an electric or hybrid vehicle. It comprises at least one electric motor and, if appropriate, a heat engine. It thus comprises an electronic circuit and a traction battery, referred to more simply as a battery in the continuation.

The battery comprises at least one electrochemical cell and preferably a plurality of electrochemical cells. Each electrochemical cell comprises a negative electrode, a positive electrode and an electrolyte interposed between the negative electrode and the positive electrode.

Each electrochemical cell can also comprise a separator, in which the electrolyte is impregnated.

The electrochemical cells can be assembled in series and/or in parallel in the battery.

The term "negative electrode" is understood to mean the electrode which acts as anode when the battery delivers current (that is to say, when it is in the process of discharging) and which acts as cathode when the battery is in the process of charging. The negative electrode typically comprises an electrochemically active material, optionally an electron-conducting material, and optionally a binder.

The term "positive electrode" is understood to mean the electrode which acts as cathode when the battery delivers current (that is to say, when it is in the process of discharging) and which acts as anode when the battery is in the process of charging. The positive electrode typically comprises an electrochemically active material, optionally an electron-conducting material, and optionally a binder.

The term "electrochemically active material" is understood to mean a material capable of reversibly inserting ions.

The term "electron-conducting material" is understood to mean a material capable of conducting electrons.

The negative electrode of the electrochemical cell can in particular comprise, as electrochemically active material, graphite, lithium, a lithium alloy, a lithium titanate of $Li_4Ti_5O_{12}$ type or titanium oxide $TiO_2$, silicon or a lithium/silicon alloy, a tin oxide, a lithium intermetallic compound or one of their mixtures.

When the negative electrode comprises lithium, the latter can be in the form of a film of metal lithium or of an alloy comprising lithium. Mention may be made, for example, among the lithium-based alloys capable of being used, of lithium-aluminum alloys, lithium-silica alloys, lithium-tin alloys, Li—Zn, $Li_3Bi$, $Li_3Cd$ and $Li_3SB$. An example of negative electrode can comprise an active lithium film prepared by rolling a strip of lithium between rollers.

The positive electrode comprises an electrochemically active material of oxide type. It is a lithium/nickel/manganese/cobalt composite oxide having a high nickel content ($LiNi_xMn_yCo_zO_2$ with x+y+z=1, abbreviated to NMC, with x>y and x>z), or a lithium/nickel/cobalt/aluminum composite oxide having a high nickel content ($LiNi_{x'}Co_{y'}Al_{z'}$ with x'+y'+z'=1, abbreviated to NCA, with x'>y' and x'>z').

Specific examples of these oxides are NMC532 ($LiNi_{0.5}Mn_{0.3}Co_{0.2}O_2$), NMC622 ($LiNi_{0.6}Mn_{0.2}Co_{0.2}O_2$) and NMC811 ($LiNi_{0.8}Mn_{0.1}Co_{0.1}O_2$).

Mixtures of these oxides can be used. The oxide material described above can, if appropriate, be combined with another oxide, such as, for example: manganese dioxide ($MnO_2$), iron oxide, copper oxide, nickel oxide, lithium/manganese composite oxides (for example $Li_xMn_2O_4$ or $Li_xM_nO_2$), lithium/nickel oxide compositions (for example $Li_xNiO_2$), lithium/cobalt oxide compositions (for example $Li_xCoO_2$), lithium/nickel/cobalt composite oxides (for example $LiNi_{1-y}Co_yO_2$), lithium and transition metal composite oxides, lithium/manganese/nickel composite oxides of spinel structure (for example $Li_xMn_{2-y}Ni_yO_4$), vanadium oxides, NMC and NCA oxides which do not have a high nickel content and their mixtures.

Preferably, the NMC or NCA oxide having a high nickel content represents at least 50% by weight, preferably at least 75% by weight, more preferably at least 90% by weight and more preferably essentially all of the oxide material present in the positive electrode as electrochemically active material.

The material of each electrode can also comprise, besides the electrochemically active material, an electron-conducting material, such as a carbon source, including, for example, carbon black, Ketjen® carbon, Shawinigan carbon, graphite, graphene, carbon nanotubes, carbon fibers (for example, vapor-grown carbon fibers or VGCF), non-powdery carbon obtained by carbonization of an organic precursor, or a combination of two or more of these. Other additives can also be present in the material of the positive electrode, such as lithium salts or inorganic particles of ceramic or glass type, or also other compatible active materials (for example sulfur).

The material of each electrode can also comprise a binder. Nonlimiting examples of binders comprise linear, branched and/or crosslinked polyether polymer binders (for example polymers based on poly(ethylene oxide) (PEO), or poly(propylene oxide) (PPO) or on a mixture of the two (or an EO/PO copolymer), and optionally comprising crosslinkable units), water-soluble binders (such as SBR (styrene/butadiene rubber), NBR (acrylonitrile/butadiene rubber), HNBR (hydrogenated NBR), CHR (epichlorohydrin rubber), ACM (acrylate rubber)), or binders of fluoropolymer type (such as PVDF (polyvinylidene fluoride), PTFE (polytetrafluoroethylene)), and their combinations. Some binders, such as those which are soluble in water, can also comprise an additive, such as CMC (carboxymethylcellulose).

The separator can be a porous polymer film. By way of nonlimiting example, the separator can consist of a porous film of polyolefin, such as ethylene homopolymers, propylene homopolymers, ethylene/butene copolymers, ethylene/hexene copolymers, ethylene/methacrylate copolymers or multilayer structures of the above polymers.

Electrolyte

The electrolyte present in the battery comprises, preferably consists of:
- a lithium salt composition;
- said lithium salt composition being dissolved in a solvent or a mixture of solvents;
- if appropriate with one or more additives.

The solvent(s) can be chosen from the following nonexhaustive list: ethers, esters, ketones, alcohols, nitriles and carbonates.

Mention may be made, among the ethers, of linear or cyclic ethers, such as, for example, dimethoxyethane (DME), methyl ethers of oligoethylene glycols of 2 to 5 oxyethylene units, dioxolane, dioxane, dibutyl ether, tetrahydrofuran and their mixtures.

Mention may be made, among the esters, of phosphoric acid esters or sulfite esters. Mention may be made, for example, of methyl formate, methyl acetate, methyl propionate, ethyl acetate, butyl acetate, γ-butyrolactone or their mixtures.

Mention may in particular be made, among the ketones, of cyclohexanone.

Mention may be made, among the alcohols, for example, of ethyl alcohol or isopropyl alcohol.

Mention may be made, among the nitriles, for example, of acetonitrile, pyruvonitrile, propionitrile, methoxypropionitrile, dimethylaminopropionitrile, butyronitrile, isobutyronitrile, valeronitrile, pivalonitrile, isovaleronitrile, glutaronitrile, methoxyglutaronitrile, 2-methylglutaronitrile, 3-methylglutaronitrile, adiponitrile, malononitrile and their mixtures.

Mention may be made, among the carbonates, for example, of cyclic carbonates, such as, for example, ethylene carbonate (EC) (CAS: 96-49-1), propylene carbonate (PC) (CAS: 108-32-7), butylene carbonate (BC) (CAS: 4437-85-8), dimethyl carbonate (DMC) (CAS: 616-38-6), diethyl carbonate (DEC) (CAS: 105-58-8), ethyl methyl carbonate (EMC) (CAS: 623-53-0), diphenyl carbonate (CAS: 102-09-0), methyl phenyl carbonate (CAS: 13509-27-8), dipropyl carbonate (DPC) (CAS: 623-96-1), methyl propyl carbonate (MPC) (CAS: 1333-41-1), ethyl propyl carbonate (EPC), vinylene carbonate (VC) (CAS: 872-36-6), fluoroethylene carbonate (FEC) (CAS: 114435-02-8), trifluoropropylene carbonate (CAS: 167951-80-6) or their mixtures.

The additive(s) can be chosen from the group consisting of fluoroethylene carbonate (FEC), vinylene carbonate, 4-vinyl-1,3-dioxolan-2-one, pyridazine, vinylpyridazine, quinoline, vinylquinoline, butadiene, sebaconitrile, alkyl disulfides, fluorotoluene, 1,4-dimethoxytetrafluorotoluene, t-butylphenol, di(t-butyl)phenol, tris(pentafluorophenyl)borane, oximes, aliphatic epoxides, halogenated biphenyls, methacrylic acids, allyl ethyl carbonate, vinyl acetate, divinyl adipate, propane sultone, acrylonitrile, 2-vinylpyridine, maleic anhydride, methyl cinnamate, phosphonates, silane compounds containing a vinyl, and 2-cyanofuran.

According to the invention, the lithium salt composition is in accordance with one of the following objects.

Object 1. Composition comprising:
- at least 99.75%, preferably at least 99.85%, advantageously at least 99.95% and more advantageously still 99.99% by weight of a bis(fluorosulfonyl)imide lithium salt;
- chlorides $Cl^-$ in a content by weight strictly of less than 20 ppm;
- the total content by weight of chlorides $Cl^-$, fluorides $F^-$ and sulfates $SO_4^{2-}$ being preferably less than or equal to 150 ppm.

In the context of the invention, the terms "bis(fluorosulfonyl)imide lithium salt", "lithium bis(fluorosulfonyl)imide", "LiFSI", "LiN(FSO$_2$)$_2$" or "bis(fluorosulfonyl)imide lithium" are used equivalently.

The notation ppm or "part per million" is understood to mean by weight.

Object 2: composition according to object 1, such that $[SO_4^{2-}]+[Cl^-]+[F^-] \leq 120$ ppm, preferably $[SO_4^{2-}]+[Cl^-]+[F^-] \leq 100$ ppm, advantageously $[SO_4^{2-}]+[Cl^-]+[F^-] \leq 80$ ppm, more advantageously still $[SO_4^{2-}]+[Cl^-]+[F^-] \leq 50$ ppm, in particular $[SO_4^{2-}]+[Cl^-]+[F^-] \leq 30$ ppm and, for example, $[SO_4^{2-}]+[Cl^-]+[F^-] \leq 20$ ppm.

Object 3: composition according to object 1 or 2, comprising a content by weight of sulfates of less than or equal to 100 ppm, preferably of less than or equal to 50 ppm, advantageously of less than or equal to 30 ppm, more advantageously still of less than or equal to 20 ppm, in particular of less than or equal to 10 ppm, with respect to the total weight of the composition.

Object 4: composition according to any one of objects 1 to 3, in which the content by weight of sulfates is strictly greater than 0 ppm, preferably greater than or equal to 0.1 ppm, with respect to the total weight of the composition.

Object 5: composition according to any one of objects 1 to 4, in which the content by weight of sulfates ranges from 0.1 ppm to 100 ppm, preferably from 0.1 ppm to 80 ppm, preferentially from 0.1 ppm to 50 ppm, advantageously from 0.1 ppm to 20 ppm, more advantageously still from 0.1 ppm to 10 ppm and in particular from 0.1 ppm to 5 ppm, with respect to the total weight of the composition.

Object 6: composition according to any one of objects 1 to 5, in which the content by weight of chlorides $Cl^-$ is less than or equal to 18 ppm, preferably less than or equal to 15 ppm, preferentially less than or equal to 12 ppm and advantageously less than or equal to 10 ppm, with respect to the total weight of the composition.

Object 7: composition according to any one of objects 1 to 6, in which the content by weight of chlorides $Cl^-$ is strictly greater than 0 ppm, preferably greater than or equal to 0.1 ppm, preferentially greater than or equal to 0.5 ppm, more preferentially still greater than or equal to 1 ppm, advantageously greater than or equal to 2 ppm, more advantageously still greater than or equal to 3 ppm and in particular greater than or equal to 4 ppm, with respect to the total weight of the composition.

Object 8: composition according to any one of objects 1 to 7, in which the content by weight of chlorides $Cl^-$ ranges from 0.1 ppm to less than 20 ppm, preferably from 0.1 ppm to 18 ppm, preferentially from 0.1 ppm to 15 ppm, advantageously from 0.1 ppm to 12 ppm and in particular from 0.1 ppm to 10 ppm, with respect to the total weight of the composition.

Object 9: composition according to any one of objects 1 to 8, in which the content by weight of fluorides $F^-$ is greater than or equal to 0.1 ppm, preferably greater than or equal to 0.5 ppm, preferentially greater than or equal to 1 ppm, advantageously greater than or equal to 2 ppm, more advantageously still greater than or equal to 3 ppm and in particular greater than or equal to 4 ppm, with respect to the total weight of the composition.

Object 10: composition according to any one of objects 1 to 9, in which the content by weight of fluorides is less than or equal to 100 ppm, preferably less than or equal to 80 ppm, preferentially less than or equal to 60 ppm, advantageously less than or equal to 50 ppm and more advantageously still less than or equal to 30 ppm, with respect to the total weight of the composition.

Object 11: composition according to any one of objects 1 to 10, in which the content by weight of fluorides $F^-$ in the composition ranges from 0.1 ppm to 100 ppm, preferably from 0.1 ppm to 80 ppm, preferentially from 0.1 ppm to 60 ppm, advantageously from 0.1 ppm to 50 ppm and in particular from 0.1 ppm to 30 ppm, with respect to the total weight of the composition.

Object 12: composition according to any one of objects 1 to 11, comprising less than 200 ppm of $K^+$, preferably less than 150 ppm, preferentially less than 100 ppm, advantageously less than 50 ppm, more advantageously still less than 30 ppm and in particular less than 10 ppm by weight, with respect to the total weight of the composition.

Object 13: composition according to any one of objects 1 to 12, comprising strictly more than 0 ppm of $K^+$, preferentially from strictly more than 0 ppm to less than 100 ppm, advantageously from strictly more than 0 ppm to less than 50 ppm, more advantageously still from strictly more than 0 ppm to less than 30 ppm and in particular from strictly more than 0 ppm to less than 10 ppm by weight, with respect to the total weight of the composition.

Object 14: composition according to any one of objects 1 to 13, in which:

$$[SO_4^{2-}]+[Cl^-]+[F^-]+[K^+] \leq 150 \text{ ppm}$$

This means that the sum of the total contents by weight of sulfates ($SO_4^{2-}$), chlorides ($Cl^-$), fluorides ($F^-$) and potassium ions ($K^+$) is less than or equal to 150 ppm, with respect to the total weight of the composition.

Object 15: composition according to any one of objects 1 to 14, in which:

$$[SO_4^{2-}]+[Cl^-]+[F^-]+[K^+] 120 \text{ ppm},$$

preferentially $[SO_4^{2-}]+[Cl^-]+[F^-]+[K^+] \leq 100$ ppm,
advantageously $[SO_4^{2-}]+[Cl^-]+[F^-]+[K^+] \leq 80$ ppm,
more advantageously still $[SO_4^{2-}]+[Cl^-]+[F^-]+[K^+] \leq 50$ ppm,
in particular $[SO_4^{2-}]+[Cl^-]+[F^-]+[K^+] \leq 30$ ppm and
for example $[SO_4^{2-}]+[Cl^-]+[F^-]+[K^+] \leq 20$ ppm.

Object 16: composition according to any one of objects 1 to 15, comprising less than 200 ppm of water, preferably less than 150 ppm, preferentially less than 100 ppm, advantageously less than 50 ppm, more advantageously still less than 30 ppm and in particular less than 10 ppm by weight of water, with respect to the total weight of the composition.

Object 17: composition according to any one of objects 1 to 16, comprising strictly more than 0 ppm of water, preferentially from strictly more than 0 ppm to less than 100 ppm, advantageously from strictly more than 0 ppm to less than 50 ppm, more advantageously still from strictly more than 0 ppm to less than 30 ppm and in particular from strictly more than 0 ppm to less than 10 ppm by weight, with respect to the total weight of the composition.

In some embodiments, only the composition of one of the above objects is a possible source of the ions mentioned above in the electrolyte (and possibly only the composition of one of the above objects is a possible source of water in the electrolyte). Consequently, the contents indicated above apply mutatis mutandis to the electrolyte itself.

In other words, advantageously, when the electrolyte contains a composition according to object 1, then the content by weight of chloride ions $Cl^-$ in the electrolyte is strictly less than 20 ppm, with respect to the LiFSI salt; and the total content by weight of chlorides $Cl^-$, fluorides $F^-$ and sulfates $SO_4^{2-}$ in the electrolyte is preferably less than or equal to 150 ppm, with respect to the LiFSI salt. And so on if the electrolyte contains a composition according to one of objects 2 to 17.

The composition according to one of the above objects can be obtained by a process for purification of a bis(fluorosulfonyl)imide lithium salt in solution in an organic solvent S1, it being possible for said process to comprise the following stages:
 a) liquid-liquid extraction with deionized water of said salt from the solution containing the organic solvent S1 and the salt, in order to form an aqueous solution of said bis(fluorosulfonyl)imide salt;
 a') optional concentration of said aqueous solution;
 b) liquid-liquid extraction with an organic solvent S2 of the bis(fluorosulfonyl)imide lithium salt from said aqueous solution (obtained in stage a) or stage a'));
 c) concentration of the bis(fluorosulfonyl)imide lithium salt obtained in stage b) in order to form a composition C;
 d) crystallization of the bis(fluorosulfonyl)imide lithium salt from the composition C;
 e) optional filtration stage;
 in order to result in the composition according to one of the above objects,
 said process being characterized in that the composition C comprises a dry extract DE of at least 30% by weight, said dry extract DE being characterized in that:
  it comprises the bis(fluorosulfonyl)imide lithium salt, preferably at a content of greater than or equal to 99.90% by weight, with respect to the total weight of said dry extract DE;
  the sum of the total contents by weight of chlorides, sulfates and fluorides is strictly greater than 0 and less than or equal to 500 ppm, preferably less than or equal to 300 ppm and advantageously less than or equal to 200 ppm by weight, with respect to the total weight of said dry extract DE.

The dry extract is typically measured on a Mettler Toledo thermobalance of HR73 type according to the following stages:
 i) an aluminum boat is placed in the Mettler Toledo thermobalance device of HR73 type;
 ii) the boat is subsequently tared;
 iii) a fiberglass disk is placed on the boat and is dried at 110° C. until a constant weight is obtained;
 iv) the boat and the fiberglass disk are calibrated;
 v) the disk is then soaked with 1 g of solution to be analyzed and is heated to 110° C.;
 vi) the dry extract is obtained when the weight becomes constant.

According to one embodiment, the total content by weight of chlorides in the abovementioned composition C is greater than 20 ppm, preferably greater than or equal to 30 ppm, preferentially greater than or equal to 50 ppm, advantageously greater than or equal to 100 ppm, for example greater than or equal to 150 ppm.

Preferably, the composition C is characterized in that the sum of the total contents by weight of chlorides, sulfates, fluorides and potassium ions is greater than or equal to 100 ppm, preferentially greater than or equal to 150 ppm and advantageously greater than or equal to 180 ppm.

According to one embodiment, the composition C comprises at least 35% by weight of said dry extract DE, preferentially at least 40% by weight and advantageously at least 50% by weight, with respect to the total weight of the composition C.

The bis(fluorosulfonyl)imide lithium salt in solution in the organic solvent S1 can be obtained by any known process for preparation of said salt, for example as described in WO2015/158979 or WO2009/123328. The LiFSI salt can be obtained either in solid form or in the form of a solution in an organic solvent S1.

The composition according to one of the above objects can be obtained by a process comprising the following stages:
i) process for preparation of the bis(fluorosulfonyl)imide lithium salt, it being possible for said salt to be solid or in solution in an organic solvent S1;
ii) stage of bringing into contact with an organic solvent S1 in the case where the LiFSI salt obtained in stage i) is solid;
iii) purification process as described above.

The abovementioned organic solvent S2 can be chosen from the group constituted of esters, nitriles, ethers, chlorinated solvents, aromatic solvents and their mixtures. Preferably, the solvent S2 is chosen from dichloromethane, ethyl acetate, butyl acetate, tetrahydrofuran, acetonitrile, diethyl ether and their mixtures. Preferably, the organic solvent S2 is butyl acetate.

According to the invention, each of the abovementioned stages a) and b) can be repeated at least once.

According to one embodiment, the organic solvent S1 is chosen from the group constituted of esters, nitriles, ethers, chlorinated solvents, aromatic solvents and their mixtures. Preferably, the solvent S1 is chosen from ethers, esters and their mixtures. Mention may be made, for example, of methyl t-butyl ether, cyclopentyl methyl ether, ethyl acetate, propyl acetate, butyl acetate, dichloromethane, tetrahydrofuran, acetonitrile, diethyl ether and their mixtures. Preferably, the solvent S1 is chosen from methyl t-butyl ether, cyclopentyl methyl ether, ethyl acetate, propyl acetate, butyl acetate and their mixtures, the organic solvent S1 preferentially being butyl acetate.

The abovementioned stage c) can be carried out in two steps:
a preconcentration, preferably carried out at a temperature ranging from 25° C. to 45° C., preferably from 30° C. to 40° C.;
a concentration stage carried out in a short-path thin-film evaporator, under the following conditions:
temperature of between 30° C. and 95° C., preferably between 30° C. and 90° C., preferentially between 40° C. and 85° C., in particular between 60° C. and 80° C.,
pressure of between $10^{-3}$ mbar abs and 5 mbar abs and in particular at between $5.10^{-1}$ and 2 mbar abs;
residence time of less than or equal to 5 min, preferably of less than or equal to 3 min.

Preferably, the preconcentration stage is carried out under reduced pressure, for example a pressure of less than or equal to 50 mbar abs, in particular at a pressure of less than or equal to 30 mbar abs.

The preconcentration stage can be carried out by any means making possible the concentration, for example using an evaporator.

In the context of the invention, and unless otherwise mentioned, the term "residence time" is understood to mean the time which elapses between the entry of the solution of bis(fluorosulfonyl)imide lithium salt (in particular obtained on conclusion of the abovementioned stage b)) into the evaporator and the exit of the first drop of the solution.

According to a preferred embodiment, the temperature of the condenser of the short-path thin-film evaporator is between −50° C. and 5° C., preferably between −35° C. and 5° C. In particular, the temperature of the condenser is −5° C.

The short-path thin-film evaporators according to the invention are also known under the name "wiped-film short-path" (WFSP) evaporators. They are typically referred to as such since the vapors generated during the evaporation cover a short path (travel a short distance) before being condensed in the condenser.

Mention may in particular be made, among the short-path thin-film evaporators, of the evaporators sold by Buss-SMS-Canzler ex Luwa AG, UIC GmbH or VTA Process.

Typically, the short-path thin-film evaporators can comprise a condenser of the vapors of solvents placed actually inside the appliance (in particular at the center of the appliance), unlike other types of thin-film evaporator (which are not short-path evaporators), in which the condenser is outside the appliance.

In this type of appliance, the formation of a thin film, of product to be distilled, on the hot inner wall of the evaporator can typically be ensured by continuous spreading over the evaporation surface using mechanical means specified below.

The evaporator can in particular be equipped, at its center, with an axial rotor on which are mounted the mechanical means which make possible the formation of the film on the wall. They can be rotors equipped with fixed vanes, lobed rotors with three or four vanes made of flexible or rigid materials, distributed over the entire height of the rotor, or rotors equipped with mobile vanes, paddles, doctor blades or guided scrapers. In this case, the rotor can consist of a succession of pivot-articulated paddles mounted on a shaft or axle by means of radial supports. Other rotors can be equipped with mobile rollers mounted on secondary axles and said rollers are held tight against the wall by centrifugation. The rotational speed of the rotor, which depends on the size of the appliance, can be readily determined by a person skilled in the art. The different rotating elements can be made of various materials: metal materials, for example steel, steel alloy (stainless steel) or aluminum, polymeric materials, for example polytetrafluoroethylene PTFE, or glass materials (enamel); metal materials coated with polymeric materials.

The crystallization stage d) can be carried out by bringing the composition obtained on conclusion of stage c) into contact with an organic solvent ("crystallization solvent") chosen from chlorinated solvents, such as, for example, dichloromethane, and aromatic solvents, such as, for example, toluene.

Preferably, the crystallization is carried out at a temperature of less than or equal to 25° C., preferentially of less than or equal to 15° C.

Installation for the Regulation of the Temperature of the Battery of a Vehicle

The invention relates to a heat-transfer method, comprising the regulation of the temperature of the battery of a motor vehicle, in a heat-transfer installation.

The method according to the invention is thus a method for cooling the battery of a vehicle; or a method for heating this battery; or a method for cooling and heating (the cooling and the heating alternating over time, according to requirements).

The method according to the invention is implemented by means of the installation presented below.

The heat-transfer installation comprises a vapor compression circuit, which contains a first heat-transfer composition, (or refrigeration circuit) and a secondary circuit, containing a second heat-transfer composition, (or heat-exchange circuit).

According to one embodiment of the invention, represented diagrammatically in FIG. 1, the vapor compression circuit 1 is coupled with the secondary circuit 2. The vapor compression circuit 1 comprises at least one first heat exchanger 3, an expansion valve 4, an intermediate heat exchanger 5 and a compressor 6. The first heat exchanger 3 is preferably of the air/refrigerant type and it makes possible an exchange of heat with an energy source, such as the surrounding air. The secondary circuit 2 comprises at least one additional heat exchanger 7.

The term "energy source" is understood to mean a solid and/or liquid and/or gaseous body which can absorb or release heat energy according to requirements. The external air, the air of the passenger compartment, the battery and the electronic circuit of the vehicle represent examples of energy sources.

In refrigeration mode (cooling of the battery), heat is transferred from the battery to the additional heat exchanger 7. Optionally, this heat transfer results in the evaporation of the second heat-transfer composition which circulates in the secondary circuit 2. Alternatively, the second heat-transfer composition remains in the liquid state during this heat transfer.

The second heat-transfer composition is subsequently sent into the intermediate heat exchanger 5, which can act as the condenser for the secondary circuit 2. Alternatively, the second heat-transfer composition remains in the liquid state during the heat transfer at the intermediate heat exchanger 5.

In the vapor compression circuit 1, the first heat-transfer composition is compressed by the compressor 6 and it passes through the first heat exchanger 3 acting as condenser (that is to say, transfers heat energy to a source, such as the external air), subsequently through the expansion valve 4, in which it is expanded, and then through the intermediate heat exchanger 5 acting as evaporator for the vapor compression circuit 1. Thus, in the intermediate heat exchanger 5, heat is transferred from the second heat-transfer composition to the first heat-transfer composition, optionally resulting in the condensation of the second heat-transfer composition and the evaporation of the first heat-transfer composition. The first heat-transfer composition is subsequently sent again to the compressor 6, while the second heat-transfer composition is sent to the additional heat exchanger 7, and makes possible the cooling of the battery.

According to certain embodiments, the installation according to the invention is also suitable for the heating of the battery, in particular when the outside temperature is low, for example less than 10° C., or than 5° C., or than 0° C., or than −5° C., or than −10° C., or than −15° C., or than −20° C., or than −25° C.

Thus, the invention also covers a method for heating the battery by means of the installation. The heating of the battery can alternate with the cooling of the battery over time, according to requirements.

In the case of the heating of the battery, heat is transferred to the battery from the additional heat exchanger 7, which can result in the condensation of the second heat-transfer composition which circulates in the secondary circuit 2. Alternatively, the second heat-transfer composition remains in the liquid state during this heat transfer.

The second heat-transfer composition is subsequently sent into the intermediate heat exchanger 5, which can act as evaporator for the secondary circuit 2. Alternatively, the second heat-transfer composition remains in the liquid state during the heat transfer at the intermediate heat exchanger 5.

In the vapor compression circuit 1, the first heat-transfer composition is expanded in the expansion valve 4 and it passes through the first heat exchanger 3 acting as evaporator (that is to say, absorbs heat energy from a source, such as the external air), subsequently through the compressor 6, in which it is compressed, and then through the intermediate heat exchanger 5 acting as condenser for the vapor compression circuit 1. Thus, in the intermediate heat exchanger 5, heat is transferred from the first heat-transfer composition to the second heat-transfer composition, resulting in the condensation of the first heat-transfer composition and optionally the evaporation of the second heat-transfer composition. The first heat-transfer composition is subsequently sent again to the expansion valve 4, while the second heat-transfer composition is sent to the additional heat exchanger 7, and makes possible the heating of the battery.

According to certain embodiments, the installation according to the invention is suitable for carrying out one or more phases of cooling of the battery alternating with one or more phases of heating of the battery.

According to certain embodiments, the installation according to the invention is also suitable for the cooling (air conditioning) of the passenger compartment of the vehicle and/or of the electronic compounds of the vehicle. A heat exchanger dedicated to the exchange of heat with the air of the passenger compartment and/or a heat exchanger dedicated to the exchange of heat with the electronic compounds is then present.

According to certain embodiments, the installation according to the invention is also suitable forth heating of the passenger compartment of the vehicle and/or of the electronic compounds of the vehicle. A heat exchanger dedicated to the exchange of heat with the air of the passenger compartment and/or a heat exchanger dedicated to the exchange of heat with the electronic compounds is then present.

In certain embodiments, one and the same heat exchanger can provide the function of the intermediate exchanger 5 described above, depending on the mode of operation.

In certain embodiments, one and the same heat exchanger can provide the function of the first heat exchanger 3, depending on the mode of operation.

Supplementary exchangers can also be added in order to ensure the different modes of operation. An assembly of pipes and valves can be used to ensure the change in mode of operation for each exchanger.

In some embodiments, the vapor compression circuit 1 is reversible and can additionally comprise means for reversion of its operation.

The means for reversion of the operation of the reversible vapor compression circuit 1 are means for reversion of the operation of the vapor compression circuit 1 between a configuration in refrigeration mode and a configuration in heat pump mode.

The abovementioned reversion means can be means for modification of the pathway of the first heat-transfer composition in the reversible vapor compression circuit 1 or means for reversion of the direction of circulation of the first heat-transfer composition in said circuit 1.

The abovementioned reversion means can be a four-way valve, a switchover valve, a shut-off (on/off) valve, an expansion valve or their combinations.

For example, during the reversal of the mode of operation of the vapor compression circuit 1, the role of a heat exchanger may be changed: for example, a heat exchanger may act as a condenser in a refrigeration mode or as an evaporator in a heat pump mode, or vice versa.

Alternatively, during the reversal of the mode of operation of the vapor compression circuit 1, the role of a heat exchanger may remain the same. Since the heat exchanger is very simply connected to other energy sources, by way of valves, it can absorb or release heat energy according to its function in the vapor compression circuit 1.

In certain preferred embodiments, the first heat-transfer composition can circulate in a single direction in the vapor compression circuit 1.

In other embodiments, the first heat-transfer composition can circulate in both directions in the vapor compression circuit 1, that is to say a first direction and an opposite direction.

The reversible vapor compression circuit 1 can typically contain pipes, conduits, hoses, a tank, or other elements, in which the first heat-transfer composition circulates, between the various exchangers, expansion valves, other valves, and the like.

When the installation is also employed for the heating of the vehicle battery, depending on the mode of operation of the vapor compression circuit 1, refrigeration or heat pump, the first heat exchanger 3 can act as evaporator or energy recoverer (condenser). It is the same for the intermediate heat exchanger 5.

It is possible to use any type of heat exchanger in the vapor compression circuit 1 and in particular cocurrent heat exchangers or, preferably, countercurrent heat exchangers.

According to a preferred embodiment, the invention provides a countercurrent heat exchanger, either at the first heat exchanger 3 or at the intermediate heat exchanger 5. This is because the heat-transfer compositions described in the present patent application are particularly effective with countercurrent heat exchangers. Preferably, both the first heat exchanger 3 and the intermediate heat exchanger 5 are countercurrent heat exchangers.

According to the invention, the term "countercurrent heat exchanger" is understood to mean a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers comprise devices in which the flow of the first fluid and the flow of the second fluid are in opposite or virtually opposite directions. Exchangers operating in crosscurrent mode with a countercurrent tendency are also included among the countercurrent heat exchangers within the meaning of the present patent application.

The compressor 6 can be hermetic, semihermetic or open. Hermetic compressors comprise a motor part and a compression part which are confined within a nondismantlable hermetic enclosure. Semihermetic compressors comprise a motor part and a compression part which are directly assembled against each other. The coupling between the motor part and the compression part is accessible on separating the two parts by dismantling. Open compressors comprise a motor part and a compression part which are separate. They can operate by belt drive or by direct coupling.

Use may in particular be made, as compressor, of a dynamic compressor or a positive displacement compressor.

Dynamic compressors comprise axial compressors and centrifugal compressors, which can have one or more stages. Miniature centrifugal compressors can also be employed.

Positive displacement compressors comprise rotary compressors and reciprocating compressors.

Reciprocating compressors comprise diaphragm compressors and piston compressors.

Rotary compressors comprise screw compressors, lobe compressors, scroll (or spiral) compressors, liquid ring compressors and vane compressors. Screw compressors can preferably be twin-screw or single-screw.

In the installation which is used, the compressor 6 can be driven by an electric motor or by a gas turbine (supplied, for example, by the exhaust gases of the vehicle) or by gearing.

In the installation which is used, the compressor 6 can comprise a device for injection of vapor or liquid. The injection consists in introducing refrigerant, in the liquid or vapor state, into the compressor at a level intermediate between the start and the end of compression.

The secondary circuit 2 comprises at least one additional heat exchanger 7.

Each additional heat exchanger 7 can be an exchanger of the fluid/solid type, or of the fluid/fluid type, or of the fluid/air type (for heating or cooling air, for example the air of the passenger compartment). In these two latter cases, the additional heat exchanger(s) 7 can again be cocurrent heat exchangers or, preferably, countercurrent heat exchangers.

At least one additional heat exchanger 7 can be configured to cool the battery. The same additional heat exchanger 7 or other additional heat exchangers 7 can be configured to heat the battery (although it is preferred for one and the same additional heat exchanger 7 to be able to both cool and heat the battery) or to cool and/or heat the passenger compartment and/or the electronic compounds of the vehicle.

In order to cool or heat the battery (and/or the electronic components), it is possible to cool or heat air which is blown toward the battery (and/or the electronic components); or else to place the additional exchanger 7 concerned directly in contact with the battery (and/or the electronic components), or to incorporate it in the battery (and/or in the electronic components).

In certain embodiments, the second heat-transfer composition is in direct contact with the battery of the vehicle. In other words, the battery of the vehicle is immersed in the second heat-transfer composition. In this case, the corresponding additional heat exchanger 7 is limited to an enclosure containing all or part of the battery, the second heat-transfer composition being contained in the enclosure and in contact with the external wall of the battery.

This makes it possible to reconcile the good dielectric and thermal properties of the heat-transfer composition in order to obtain a better result. In this case, it is preferable for the second heat-transfer composition to have a boiling pressure of less than 2 bar at a temperature of 30° C. If the boiling pressure of the second heat-transfer composition is not low enough, the direct contact requires a great deal of effort in the design of the housing of the battery in order to withstand the pressure. In this case, the pressure stress is managed more easily by using an additional heat exchanger 7 in the form, for example, of cooling plates.

In certain embodiments, the secondary circuit 2 does not comprise a compressor. In other words, the secondary circuit 2 is not a vapor compression circuit.

In certain embodiments, the second heat-transfer composition is at an essentially uniform pressure in the secondary circuit, said pressure being equal to the saturated pressure of the second heat-transfer composition at the temperature of the second heat-transfer composition. A slight deviation is possible in the event of loss of head The temperature of the second heat-transfer composition is preferably uniform in the secondary circuit.

In certain embodiments, the second heat-transfer composition remains at a constant temperature during the method.

The term "saturated pressure" is understood to mean the pressure at which a gas phase of a composition is in equilibrium with a liquid phase at a given temperature in a closed system.

In certain embodiments, the secondary circuit 2 can comprise one or more valves, in particular when it comprises several additional heat exchangers 7, in order to direct the second heat-transfer composition to one or more specific additional heat exchangers 7; and/or in order to make possible the change in the direction of circulation of the second heat-transfer composition in all or part of the secondary circuit 2.

In certain preferred embodiments, the second heat-transfer composition can circulate in a single direction in all or part of the secondary circuit 2.

In certain embodiments, the second heat-transfer composition can circulate in both directions in all or part of the secondary circuit 2, that is to say a first direction and an opposite direction.

In certain embodiments, the circulation of the second heat-transfer composition in the secondary circuit 2 from the intermediate heat exchanger 5 to the additional heat exchanger(s) 7, and/or from the additional heat exchanger(s) 7 to the intermediate heat exchanger 5, can be carried out by means of a pump, or by gravity, or by capillary action.

In this installation according to the invention, the vapor compression circuit 1 can be coupled with the secondary circuit 2 by the intermediate heat exchanger 5. Thus, both the first heat-transfer composition and the second heat-transfer composition can pass through the intermediate heat exchanger 5.

During the cooling of the battery, the intermediate heat exchanger 5 can evaporate the first heat-transfer composition (and possibly condense the second heat-transfer composition) and the additional heat exchanger 7 is configured to transfer heat from the battery to the second heat-transfer composition.

During the heating of the battery, the intermediate heat exchanger 5 can condense the first heat-transfer composition (and possibly evaporate the second heat-transfer composition) and the additional heat exchanger 7 is configured to transfer heat from the second heat-transfer composition to the battery (possibly while condensing the second heat-transfer composition).

In certain embodiments, the second heat-transfer composition is in the liquid state throughout the secondary circuit 2. The temperature of the second heat-transfer composition is modified when crossing the additional heat exchanger 7 and when crossing the intermediate heat exchanger 5. This is in particular the preferred option when the battery is immersed in the second heat-transfer composition.

In the context of the present patent application, each evaporation and each condensation can be total or partial.

An evaporation can thus consist in starting from the liquid state to pass into the vapor state; or from the two-phase liquid/vapor state to the vapor state; or from the liquid state to the two-phase liquid/vapor state; or from one two-phase liquid/vapor state to another two-phase liquid/vapor state.

A condensation can thus consists in starting from the vapor state to pass into the liquid state; or from the vapor state to the two-phase liquid/vapor state; or from the two-phase liquid/vapor state to the liquid state; or from one two-phase liquid/vapor state to another two-phase liquid/vapor state.

The evaporation and the condensation can be carried out at constant temperature, or at variable temperature in the case of nonazeotropic mixtures of heat-transfer compounds.

In certain embodiments, in the intermediate heat exchanger 5, one composition (the first heat-transfer composition or the second heat-transfer composition) is at a lower temperature than the other; preferably, the temperature difference is less than 12° C., preferably less than 8° C. and more preferably less than 5° C. Assuming that the temperature of a composition is not constant in the intermediate heat exchanger 5, the reference taken for the estimation of the above temperature difference is the median temperature between the inlet and the outlet of the intermediate heat exchanger.

In certain embodiments, the cooling and/or the heating make it possible to maintain the temperature of the battery within an optimum temperature range, in particular when the vehicle is in operation (engine on) and especially when the vehicle is moving.

In certain embodiments, the temperature of the battery of the vehicle is thus maintained between a minimum temperature $t_1$ and a maximum temperature $t_2$.

In certain embodiments, the minimum temperature $t_1$ is greater than or equal to 0° C. and the maximum temperature $t_2$ is less than or equal to 60° C., preferably the minimum temperature $t_1$ is greater than or equal to 15° C. and the maximum temperature $t_2$ is less than or equal to 40° C., and more preferably the minimum temperature $t_1$ is greater than or equal to 16° C. and the maximum temperature $t_2$ is less than or equal to 28° C.

In certain embodiments, the outside temperature during the maintenance of the temperature of the battery between the minimum temperature $t_1$ and the maximum temperature $t_2$ is greater than or equal to 20° C., preferably greater than or equal to 30° C., more preferably greater than or equal to 35° C., more preferably greater than or equal to 40° C.

The outside temperature during the duration the maintenance of the temperature of the battery of the vehicle between the minimum temperature $t_1$ and the maximum temperature $t_2$ can in particular be from −25 to −20° C.; or from −20 to −15° C.; or from −15 to −10° C.; or from −10 to −5° C.; or from −5 to 0° C.; or from 0 to 5° C.; or from 5 to 10° C.; or from 10 to 15° C.; or from 15 to 20° C.; or from 20 to 25° C.; or from 25 to 30° C.; or from 30 to 35° C.; or from 35 to 40° C.; or from 40 to 45° C.; or from 45 to 50° C.

The term "outside temperature" is understood to mean the ambient temperature outside the vehicle before and during the maintenance of the temperature of the battery of the vehicle between the minimum temperature $t_1$ and the maximum temperature $t_2$.

The term "temperature of the battery" is understood to mean generally the temperature of an exterior wall of one or more of the electrical energy storage elements.

The temperature of the battery can be measured by means of a temperature sensor. If several temperature sensors are present at the battery, the temperature of the battery can be regarded as being the mean of the different temperatures measured.

In certain embodiments, the installation and the method of the present invention make it possible to cool or heat (and preferably to cool) the battery of the vehicle and to maintain it in an optimum temperature range (as detailed above) during the charging of the battery.

In particular, the charging of the battery can be a fast charging. Thus, during the complete charging of the battery (from a moment when the battery is completely discharged) for a period of time of less than or equal to 30 min and preferably of less than or equal to 15 min, the method according to the invention makes it possible to maintain the temperature of the battery within an optimum temperature range. This exhibits an advantage, given that, during fast charging, the battery tends to heat up quickly and to reach high temperatures which can influence its operation and its performance qualities.

In certain embodiments, the second heat-transfer composition is maintained at a temperature of between 10 and 40° C., preferably between 20 and 30° C., throughout the secondary circuit 2.

Heat-Transfer Compositions

The invention uses a first heat-transfer composition and a second heat-transfer composition, each heat-transfer composition comprising a heat-transfer fluid optionally in combination with lubricants and/or additives. The heat-transfer fluid can comprise one or more heat-transfer compounds.

The first heat-transfer composition is present and circulates in the vapor compression circuit.

In certain embodiments, the heat-transfer fluid of the first heat-transfer composition comprises HFO-1234yf.

In certain embodiments, this heat-transfer fluid comprises at least 50% of HFO-1234yf, or at least 60% of HFO-1234yf, or at least 70% of HFO-1234yf, or at least 80% of HFO-1234yf, or at least 90% of HFO-1234yf, or at least 95% of HFO-1234yf, by weight.

In certain embodiments, this heat-transfer fluid consists essentially, indeed even consists, of HFO-1234yf.

In other preferred embodiments, this heat-transfer fluid also comprises one or more other heat-transfer compounds, such as hydrofluorocarbons and/or hydrofluoroolefins and/or hydrocarbons and/or hydrochlorofluoroolefins and/or $CO_2$.

Mention may in particular be made, among hydrofluorocarbons, of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1-trifluoropropane (HFC-263fb) and their mixtures.

Mention may in particular be made, among hydrofluoroolefins, of 1,3,3,3-tetrafluoropropene (HFO-1234ze), in cis and/or trans form, and preferably in trans form; and trifluoroethylene (HFO-1123).

Mention may in particular be made, among hydrochlorofluoroolefins, of 1-chloro-3,3,3-trifluoropropene (HCFO-1233zd), in Z and/or E form, and preferably in E form.

According to preferred embodiments, the heat-transfer fluid of the first heat-transfer composition comprises HFO-1234yf and HFC-32. Preferably, the heat-transfer fluid is a binary composition of HFO-1234yf and HFC-32 (that is to say that it consists, or consists essentially, of HFO-1234yf and HFC-32).

Thus, the HFO-1234yf can have a content of 60% to 90% by weight and the HFC-32 can have a content of 40% to 10% by weight, preferably the HFO-1234yf can have a content of 70% to 80% by weight and the HFC-32 can have a content of 20% to 30% by weight, and more preferably the HFO-1234yf can have a content of 75% to 80% by weight and the HFC-32 can have a content of 20% to 25% by weight. According to preferred embodiments, HFO-1234yf is present at a content of approximately 78.5% by weight and HFC-32 is present at a content of approximately 21.5% by weight. The percentages by weight are given with respect to the heat-transfer fluid of the first heat-transfer composition.

The additives which can be present in the first heat-transfer composition of the invention can in particular be chosen from nanoparticles, stabilizing agents, surfactants, tracing agents, fluorescent agents, odorous agents and solubilizing agents.

The total amount of additives does not exceed 5% by weight, in particular 4%, more particularly 3% and very particularly 2% by weight, indeed even 1% by weight, of the first heat-transfer composition.

In certain embodiments, the HFO-1234yf contains impurities. When they are present, they can represent less than 1%, preferably less than 0.5%, preferably less than 0.1%, preferably less than 0.05% and preferably less than 0.01% (by weight), with respect to the HFO-1234yf.

The heat-transfer fluid of the first heat-transfer composition can optionally comprise HFO-1243zf (3,3,3-trifluoropropene) and/or 3,3,3-trifluoropropyne.

The content of HFO-1243zf in the heat-transfer fluid can be less than or equal to 10 000 ppm, or 5000 ppm, or 1000 ppm, or 500 ppm, or 100 ppm, or 50 ppm.

By way of example, the content of HFO-1243zf in the heat-transfer fluid can be: from 0 to 1 ppm, or from 1 to 10 ppm, or from 10 to 50 ppm, or from 50 to 100 ppm, or from 100 to 500 ppm, or from 500 to 1000 ppm, or from 1000 to 5000 ppm, or from 5000 to 10 000 ppm.

The content of 3,3,3-trifluoropropyne in the heat-transfer fluid can be less than or equal to 10 000 ppm, or 5000 ppm, or 1000 ppm, or 500 ppm, or 100 ppm, or 50 ppm.

By way of example, the content of 3,3,3-trifluoropropyne in the heat-transfer fluid can be: from 0 to 1 ppm, or from 1 to 10 ppm, or from 10 to 50 ppm, or from 50 to 100 ppm, or from 100 to 500 ppm, or from 500 to 1000 ppm, or from 1000 to 5000 ppm, or from 5000 to 10 000 ppm.

The above ppm values are given by weight.

One or more lubricants can be present in the first heat-transfer composition. These lubricants can be chosen from polyol esters (POEs), polyalkylene glycols (PAGs) or polyvinyl ethers (PVEs).

The lubricants can represent from 1% to 50%, preferably from 2% to 40% and more preferably from 5% to 30% (by weight) of the first heat-transfer composition.

The heat-transfer fluid of the second heat-transfer composition preferably comprises one or more heat-transfer compounds having a boiling point of 0 to 40° C., preferably of 5 to 35° C. and more preferably of 8 to 34° C.

The term "boiling point of a compound" is understood to mean the temperature at which the compound boils under a pressure of 1 bar.

In certain embodiments, the heat-transfer fluid of the second heat-transfer composition has a boiling point of 0 to 40° C., preferably of 5 to 35° C. and more preferably of 8 to 34° C.

In the case of a mixture of several compounds, the boiling point of the mixture corresponds to the mean between the boiling start point and the boiling end point at a pressure of 1 bar.

In certain embodiments, the heat-transfer compound(s) having a boiling point of 0 to 40° C. can be chosen from hydrochlorofluoroolefins, hydrofluoroolefins and the combinations of these.

In certain embodiments, the hydrochlorofluoroolefins can be chosen from 1-chloro-3,3,3-trifluoropropene (HCFO-1233zd) and 1-chloro-2,3,3,3-tetrafluoropropene (HCFO-1224yd) and the combinations of these.

The HCFO-1233zd can be in E and/or Z form.

For example, the HCFO-1233zd can comprise more than 50 mol % of the E form, preferably more than 60 mol % of the E form, preferably more than 70 mol % of the E form, preferably more than 80 mol % of the E form, preferably more than 85 mol % of the E form, preferably more than 90 mol % of the E form, preferably more than 95 mol % of the E form, preferably more than 98 mol % of the E form and more preferably more than 99 mol % of the E form. Preferably, it is entirely, or essentially entirely, in E form.

For example, the HCFO-1233zd can comprise more than 50 mol % of the Z form, preferably more than 60 mol % of the Z form, preferably more than 70 mol % of the Z form, preferably more than 80 mol % of the Z form, preferably more than 85 mol % of the Z form, preferably more than 90 mol % of the Z form, preferably more than 95 mol % of the Z form, preferably more than 98 mol % of the Z form and more preferably more than 99 mol % of the Z form. Preferably, it is entirely, or essentially entirely, in Z form.

The HCFO-1224yd can be in E and/or Z form.

Preferably, the HCFO-1224yd comprises more than 50 mol % of the Z form, preferably more than 60 mol % of the Z form, preferably more than 70 mol % of the Z form, preferably more than 80 mol % of the Z form, preferably more than 85 mol % of the Z form, preferably more than 90 mol % of the Z form, preferably more than 95 mol % of the Z form, preferably more than 98 mol % of the Z form and more preferably more than 99 mol % of the Z form. Preferably, it is entirely in Z form.

In certain embodiments, the hydrofluoroolefin can be 1,1,1,4,4,4-hexafluorobut-2-ene (HFO-1336mzz) in E and/or Z form.

The HFO-1336mzz can thus comprise more than 50 mol % of the Z form, preferably more than 60 mol % of the Z form, preferably more than 70 mol % of the Z form, preferably more than 80 mol % of the Z form, preferably more than 85 mol % of the Z form, preferably more than 90 mol % of the Z form, preferably more than 95 mol % of the Z form, preferably more than 98 mol % of the Z form and more preferably more than 99 mol % of the Z form. It can be entirely in Z form.

Alternatively, the HFO-1336mzz can comprise more than 50 mol % of the E form, preferably more than 60 mol % of the E form, preferably more than 70 mol % of the E form, preferably more than 80 mol % of the E form, preferably more than 85 mol % of the E form, preferably more than 90 mol % of the E form, preferably more than 95 mol % of the E form, preferably more than 98 mol % of the E form and more preferably more than 99 mol % of the E form. It can be entirely in E form.

In certain embodiments, the heat-transfer compounds used in the second heat-transfer composition have a latent heat of evaporation at 20° C. of greater than 100 kJ/kg, preferably of greater than 110 kJ/kg, more preferably of greater than 120 kJ/kg, more preferably of greater than 130 kJ/kg, more preferably of greater than 140 kJ/kg, more preferably of greater than 150 kJ/kg and more preferably of greater than 160 kJ/kg.

The latent heat values of the heat-transfer compounds preferentially used in the second composition as heat-transfer fluid are presented in the table below for a temperature of 20° C. The highest latent heat is observed for HCFO-1233zd(E).

TABLE 1

| Heat-transfer compound | Temperature (° C.) | Pressure (bar) | Latent heat of evaporation (kJ/kg) |
|---|---|---|---|
| HCFO-1233zd(E) | 20 | 1.07 | 194 |
| HFO-1336mzz(Z) | 20 | 0.6 | 171 |
| HFO-1336mzz(E) | 20 | 1.66 | 141 |
| HCFO-1224yd(Z) | 20 | 1.26 | 164 |

In certain embodiments, the heat-transfer fluid of the second heat-transfer composition comprises a single heat-transfer compound.

In certain embodiments, the heat-transfer fluid of the second heat-transfer composition can be a binary mixture of heat-transfer compounds.

In certain embodiments, the heat-transfer fluid of the second heat-transfer composition can be a ternary mixture of heat-transfer compounds.

The second heat-transfer composition is present and circulates in the secondary circuit.

In certain embodiments, the second heat-transfer composition undergoes neither compression nor expansion.

In certain embodiments, the second heat-transfer composition comprises at least 50% of heat-transfer fluid, or at least 60% of heat-transfer fluid, or at least 70% of heat-transfer fluid, or at least 80% of heat-transfer fluid, or at least 90% of heat-transfer fluid, or at least 95% of heat-transfer fluid, by weight.

In certain embodiments, the heat-transfer fluid of the second heat-transfer composition consists essentially, indeed even consists, of heat-transfer compounds.

The additives which can be present in the second heat-transfer composition of the invention are the same as those described above in connection with the first heat-transfer composition, the same concentration ranges applying.

Furthermore, the second heat-transfer composition can comprise a C3 to C6 alkene stabilizer, in particular a butene or a pentene.

EXAMPLES

The present invention is illustrated by the following examples, to which it is not, however, limited.

Examples 1 and 2—Preparation of LiFSI (According to the Invention)

Crude LiFSI in solution in butyl acetate is obtained on conclusion of the process described in WO 2015/158979. The LiFSI solution is subjected to a purification process comprising the liquid-liquid extraction of said salt with deionized water in order to form an aqueous solution, followed by the liquid-liquid extraction of the bis(fluorosulfonyl)imide lithium salt from said aqueous solution with butyl acetate. The solution obtained was subjected to a concentration stage in order to result in a composition comprising more than 30% by weight of a dry extract, characterized in that the extract comprises more than 99.75% by weight of LiFSI and in that the sum of the total contents by weight of chlorides, sulfates and fluorides is strictly greater than 0 and less than 500 ppm. The composition is subsequently subjected to a crystallization and filtration stage, in order to result in the LiFSI of example 1.

The LiFSI of example 2 was obtained according to a similar process.

Example 3—Preparation of LiFSI (Comparative)

Crude LiFSI in solution in butyl acetate is obtained on conclusion of the process described in WO 2015/158979. The LiFSI solution is subjected to a purification process comprising the liquid-liquid extraction of said salt with deionized water in order to form an aqueous solution, followed by the liquid-liquid extraction of the bis(fluorosulfonyl)imide lithium salt from said aqueous solution with butyl acetate. The solution obtained was subjected to a concentration stage in order to result in a composition comprising a dry extract, characterized in that the extract comprises less than 99.75% by weight of LiFSI and in that the sum of the total contents by weight of chlorides, sulfates and fluorides is strictly greater than 600 ppm.

The composition is subsequently subjected to a crystallization and filtration stage, in order to result in the LiFSI of example 3.

Example 4—Characterization

Cyclic voltammetry tests were carried out. For this, CR2032 button cells were manufactured equipped with an aluminum sheet having a diameter of 20 mm as working electrode, with a lithium metal pellet having a diameter of 8 mm as reference electrode and with a glass fiber separator having a diameter of 18 mm soaked with 12 drops (0.6 ml) of a 1 mol/l solution of LiFSI of different compositions in a solvent mixture composed of ethylene carbonate and methyl ethyl carbonate (CAS=623-53-0) in a 3/7 ratio by volume.

Subsequently, a voltage sweep is carried out at the terminals of the 4.5 V button cell. Two preliminary sweeps are carried out making possible the formation of passivation layers, such as the SEI and the passivation of the aluminum. Subsequently, the 4.5 V oxidation current (after the two sweeps) generated was measured and recorded. The values are as follows:

TABLE 2

| | | Content of chlorides | $[SO_4^{2-}]$ + $[Cl^-]$ + $[F^-]$ | I ($\mu$A) |
|---|---|---|---|---|
| Example 1 | LiFSI | 5 ppm | ≤150 ppm | 133 |
| Example 2 | LiFSI | 10 ppm | ≤150 ppm | 134 |
| Example 3 (comparative) | LiFSI | 20 ppm | ≤150 ppm | 685 |

The observed oxidation current can reflect numerous phenomena: corrosion of the aluminum, degradation of the electrolyte and swelling of the battery. All these phenomena are responsible for the degradation of the lifetime of Li-ion batteries. The lower the current, the more the lifetime of the battery is improved. At 4.5 V, the results show that the use of a LiFSI having in particular a content of chlorides of less than 20 ppm advantageously makes it possible to reduce this oxidation current, in comparison with a LiFSI having a content of chlorides of 20 ppm, and thus to improve the lifetime of Li-ion batteries.

The invention claimed is:

1. A method for regulation of the temperature of a battery of an electric or hybrid motor vehicle by means of a system comprising a vapor compression circuit in which a first heat-transfer composition circulates and a secondary circuit in which a second heat-transfer composition circulates, the method comprising:
   an exchange of heat between the battery and the second heat-transfer composition;
   an exchange of heat between the second heat-transfer composition and the first heat-transfer composition;
   the battery comprising at least one electrochemical cell comprising a negative electrode, a positive electrode and an electrolyte comprising a lithium salt composition, said lithium salt composition comprising:
      at least 99.75% by weight of a bis(fluorosulfonyl)imide lithium salt;
      chlorides Cl⁻ in a content by weight strictly of less than 20 ppm.

2. The method as claimed in claim 1, in which the first heat-transfer composition comprises 2,3,3,3-tetrafluoropropene.

3. The method as claimed in claim 1, in which the first heat-transfer composition comprises one or more heat-transfer compounds other than 2,3,3,3-tetrafluoropropene.

4. The method as claimed in claim 3, in which 2,3,3,3-tetrafluoropropene is present at a content of approximately 78.5% by weight in the first heat-transfer composition and difluoromethane is present at a content of approximately 21.5% by weight in the first heat-transfer composition.

5. The method as claimed in claim 1, in which the second heat-transfer composition comprises one or more heat-transfer compounds having a boiling point of 0 to 40° C.

6. The method as claimed in claim 1, in which the second heat-transfer composition is at a uniform pressure in the secondary circuit.

7. The method as claimed in claim 1, in which the battery is maintained at a temperature of between a minimum temperature $t_1$ and a maximum temperature $t_2$.

8. The method as claimed in claim 7, in which the minimum temperature $t_1$ is greater than or equal to 0° C. and the maximum temperature $t_2$ is less than or equal to 60° C.

9. The method as claimed in claim 1, implemented during a charging of the battery of the vehicle.

10. The method as claimed in claim 1, in which the second heat-transfer composition is in direct contact with the battery of the vehicle.

11. An installation for regulation of the temperature of a battery of an electric or hybrid motor vehicle, comprising:
   a vapor compression circuit in which a first heat-transfer composition circulates; and
   a secondary circuit in which a second heat-transfer composition circulates;
   the vapor compression circuit being coupled with the secondary circuit by an intermediate heat exchanger, so as to make possible an exchange of heat between the first heat-transfer composition and the second heat-transfer composition; and the installation comprising an additional heat exchanger configured to exchange heat between the battery and the second heat-transfer composition;
   the battery comprising at least one electrochemical cell comprising a negative electrode, a positive electrode and an electrolyte comprising a lithium salt composition, said lithium salt composition comprising:
      at least 99.75% by weight of a bis(fluorosulfonyl)imide lithium salt;
      chlorides Cl⁻ in a content by weight strictly of less than 20 ppm.

12. The installation as claimed in claim 11, in which the secondary circuit does not comprise a compressor.

13. The installation as claimed in claim 11, in which the circulation of the second heat-transfer composition in the secondary circuit is carried out by means of a pump, or by gravity, or by capillary action.

14. The installation as claimed in claim 11, adapted for air conditioning of a passenger compartment of the vehicle, and/or heating of the passenger compartment of the vehicle, and/or cooling of electronic compounds of the vehicle, and/or heating of electronic compounds of the vehicle.

15. The installation as claimed in claim 11, in which the first heat-transfer composition comprises one or more heat-transfer compounds other than 2,3,3,3-tetrafluoropropene.

16. The installation as claimed in claim 15, in which 2,3,3,3-tetrafluoropropene is present at a content of approximately 78.5% by weight in the first composition and difluoromethane is present at a content of approximately 21.5% by weight in the first composition.

\* \* \* \* \*